US008155867B2

(12) United States Patent
Krause

(10) Patent No.: US 8,155,867 B2

(45) Date of Patent: Apr. 10, 2012

(54) SYSTEM AND METHOD FOR COMMUNICATING WITH A VEHICLE ABOUT THEN-CURRENT VEHICLE OPERATING CONDITIONS USING A TELEMATICS UNIT

(75) Inventor: Kevin R. Krause, Plymouth, MI (US)

(73) Assignee: General Motors LLC, Detroit, MI (US)

(*) Notice: Subject to any disclaimer, the term of this patent is extended or adjusted under 35 U.S.C. 154(b) by 522 days.

(21) Appl. No.: 12/362,474

(22) Filed: Jan. 29, 2009

(65) Prior Publication Data

US 2010/0191403 A1 Jul. 29, 2010

(51) Int. Cl.
*G06F 19/00* (2011.01)
*G01M 17/00* (2006.01)
*H04B 7/24* (2006.01)

(52) U.S. Cl. ............... 701/123; 701/29; 701/36; 455/39

(58) Field of Classification Search .................... 701/29, 701/35, 36, 104, 123; 455/39, 91, 92
See application file for complete search history.

(56) References Cited

U.S. PATENT DOCUMENTS

| | | | | |
|---|---|---|---|---|
| 6,202,024 | B1 * | 3/2001 | Yokoyama et al. | 701/207 |
| 6,381,522 | B1 * | 4/2002 | Watanabe et al. | 701/22 |
| 6,487,477 | B1 | 11/2002 | Woestman et al. | |
| 6,687,607 | B2 * | 2/2004 | Graf et al. | 701/202 |
| 7,062,371 | B2 * | 6/2006 | Gault et al. | 701/109 |
| 7,539,562 | B2 * | 5/2009 | Maguire et al. | 701/22 |
| 7,958,958 | B2 * | 6/2011 | de la Torre Bueno | 180/65.29 |
| 2004/0068359 | A1 | 4/2004 | Neiss et al. | |
| 2006/0211446 | A1 * | 9/2006 | Wittmann et al. | 455/552.1 |

* cited by examiner

*Primary Examiner* — Sarah B McPartlin

(74) *Attorney, Agent, or Firm* — Dierker & Associates, P.C.

(57) ABSTRACT

A method for communicating with a vehicle about then-current vehicle operating conditions is disclosed herein. The method includes real-time monitoring, via a telematics unit in a vehicle, of vehicle data when the vehicle is traveling on a road segment, comparing the real-time monitored vehicle data with previously stored data of one or more other vehicles that previously traveled the road segment, and based on the comparison, determining an operation of the vehicle in order to achieve optimal fuel efficiency. The method further includes submitting, to the vehicle, the operation of the vehicle for i) increasing a then-current fuel efficiency of the vehicle or ii) maintaining the then-current fuel efficiency of the vehicle. Also disclosed herein is a system for accomplishing the same.

19 Claims, 3 Drawing Sheets

SYSTEM AND METHOD FOR COMMUNICATING WITH A VEHICLE ABOUT THEN-CURRENT VEHICLE OPERATING CONDITIONS USING A TELEMATICS UNIT

TECHNICAL FIELD

The present disclosure relates generally to systems and methods for communicating with a vehicle about then-current vehicle operating conditions.

BACKGROUND

Vehicle users may be apt to find alternative vehicle operation methods, for example, to achieve better fuel economy. Hypermiling is one example of such a vehicle operation method or technique, and it is often employed by racecar drivers. Examples of hypermiling include coasting and pulse-and-gliding. Coasting involves manually removing engine power by shifting into neutral gear for a period of time based on, for example, characteristics of the road segment that the vehicle is traveling on. Pulse-and-gliding involves applying engine power after a period of coasting and then removing the engine power to start coasting again. Although hypermiling may be useful at least to improve fuel economy, such operation methods or techniques often entail significant amounts of a vehicle driver's attention and/or skill. Furthermore, many vehicle drivers are not specifically trained to apply hypermiling techniques, and therefore, assessing when such techniques should be applied may, in some instances, present some challenges.

SUMMARY

A method for communicating with a vehicle about then-current vehicle operating conditions is disclosed herein. The method includes real-time monitoring, via a telematics unit in a vehicle, of vehicle data when the vehicle is traveling on a road segment, comparing the real-time monitored vehicle data with previously stored data of one or more other vehicles that previously traveled the road segment, and based on the comparison, determining an operation of the vehicle in order to achieve optimal fuel efficiency. The method further includes submitting, to the vehicle, the operation of the vehicle for i) increasing a then-current fuel efficiency of the vehicle or ii) maintaining the then-current fuel efficiency of the vehicle. Also disclosed herein is a system for accomplishing the same.

BRIEF DESCRIPTION OF THE DRAWINGS

Features and advantages the present disclosure will become apparent by reference to the following detailed description and drawings, in which like reference numerals correspond to the same or similar, though perhaps not identical, components. For the sake of brevity, reference numerals or features having a previously described function may or may not be described in connection with other drawings in which they appear.

DETAILED DESCRIPTION

Figure 1:
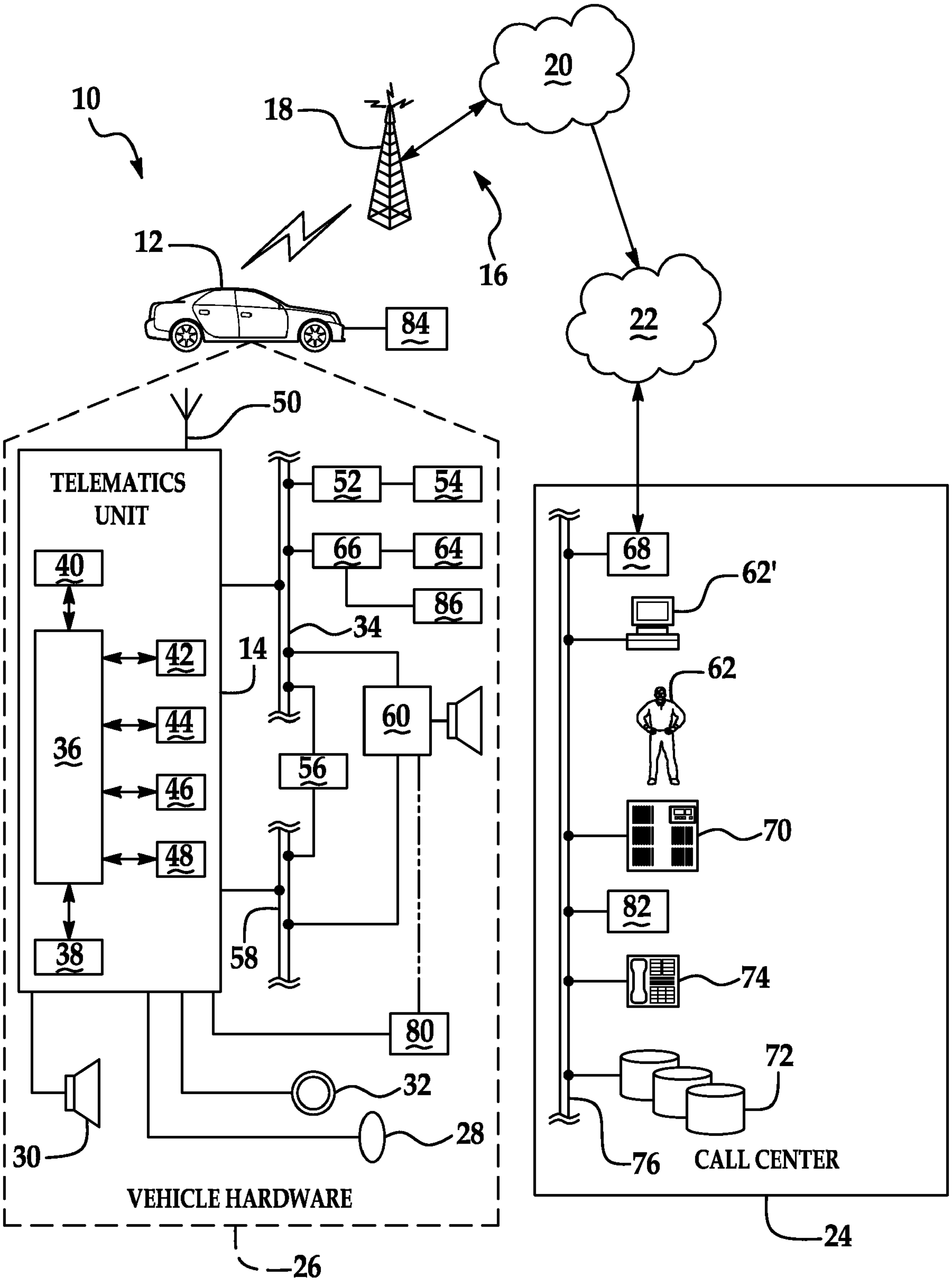
FIG. 1 is a schematic diagram depicting an example of a system for communicating with a vehicle about then-current operating conditions.

Example(s) of the method and system disclosed herein may advantageously be used for communicating with a vehicle about then-current operating conditions in order to increase or maintain a then-current fuel efficiency of the vehicle. Such communication is based, at least in part, on monitoring vehicle data in real time using a telematics unit operatively associated with the vehicle. The vehicle data are used to determine an operation of the vehicle that will assist in achieving optimal fuel efficiency. The operation of the vehicle may, in an example, be communicated to a vehicle operator as a suggestion, where the vehicle operator may choose to either implement or reject the suggestion. The operation of the vehicle may, in another example, also be automatically communicated to a powertrain system of the vehicle, where the vehicle operation is automatically implemented or rejected. In either case, the operation of the vehicle may be implemented in order to increase or maintain the then-current fuel efficiency of the vehicle. Non-limiting examples of such operations include altering or maintaining vehicle speed, tire pressure when inflations devices are present on-board the vehicle, powertrain parameter adjustments (e.g., fuel flow, engine operating parameters, extended range powerplant switching (such as for hybrid vehicles)), driving techniques, or the like.

It is to be understood that, as used herein, the term "user" includes vehicle owners, operators, and/or passengers. It is to be further understood that the term "user" may be used interchangeably with subscriber/service subscriber.

As also used herein, the term "vehicle operator" refers to a person who has control over the operations of the vehicle while the vehicle is moving. It is to be understood that the term "vehicle operator" may be used interchangeably with the term "vehicle driver".

Yet further, the term "fuel efficiency" refers to the energy efficiency of a vehicle, often measured in terms of a distance traveled by the vehicle per amount of gasoline burned (e.g., mpg) (such as for gasoline-powered vehicles) or energy consumed (such as for electric vehicles). The "fuel efficiency" may be used interchangeably with the term "fuel economy". Furthermore, the term "optimal fuel efficiency" refers to the best fuel efficiency for the vehicle at a particular time based, at least in part, on then-current vehicle operating conditions determined at least from real-time monitored vehicle data.

Additionally, it is to be understood that the term "road segment" refers to a paved or non-paved piece of land designated for vehicles to travel on. Non-limiting examples of road segments include at least portions of roads, highways, streets, boulevards, lanes, courts, trails, and/or the like. It is to be understood that a road segment may, in some instances, be an entire road, street, etc. Such an instance may include, for example, a residential road or street that is relatively short in length. It is further to be understood that a road segment may, in other instances, be a portion of a road, street, etc. Such an instance may include, for example, a portion of Interstate-75 located between Detroit and Flint.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

It is to be further understood that "communication" is to be construed to include all forms of communication, including direct and indirect communication. As such, indirect communication may include communication between two components with additional component(s) located therebetween.

Referring now to FIG. 1, the system 10 includes a vehicle 12, a telematics unit 14, a wireless carrier/communication system 16 (including, but not limited to, one or more cell towers 18, one or more base stations and/or mobile switching centers (MSCs) 20, and one or more service providers (not shown)), one or more land networks 22, and one or more call centers 24. In an example, the wireless carrier/communication system 16 is a two-way radio frequency communication system.

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicle 12 is a mobile vehicle such as a motorcycle, car, truck, recreational vehicle (RV), boat, plane, etc., and is equipped with suitable hardware and software that enables it to communicate (e.g., transmit and/or receive voice and data communications) over the wireless carrier/communication system 16. It is to be understood that the vehicle 12 may also include additional components suitable for use in the telematics unit 14.

The vehicle 12 also includes several internal operation systems including, for example, a powertrain system 84. In an example, the powertrain system 84 may be configured with a processor (not shown) including software for receiving automatic signal transmissions from the telematics unit 14 and for implementing vehicle operations provided in the automatic signal transmission.

Some of the vehicle hardware 26 is shown generally in FIG. 1, including the telematics unit 14 and other components that are operatively connected to the telematics unit 14. Examples of such other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard device that provides a variety of services, both individually and through its communication with the call center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. In one example, the wireless modem 42 includes a computer program and/or set of software routines executing within processing device 36.

In an embodiment, the telematics unit 14 is configured to monitor, in real time, vehicle data when the vehicle 12 is traveling. As used herein, the term "vehicle data" refers to any information related to the vehicle 12 and/or its surrounding environment that will allow at least one of the telematics unit 14 or the call center 24 to determine one or more then-current operating conditions of the vehicle 12 to achieve optimal fuel efficiency. Non-limiting examples of information related to the vehicle 12 include vehicle weight, then-current vehicle speed, then-current air pressure of one or more tires of the vehicle, then-current fuel efficiency of the vehicle, then-current amount of fuel remaining in the vehicle tank, and/or the like, and/or combinations thereof. Further, non-limiting examples of information related to the surrounding environment include then-current environmental conditions (e.g., snow, rain, ice, fog, etc.), ambient air temperature, elevation, humidity level of the ambient air, pitch and yaw information of the vehicle, local traffic information, and/or the like, and/or combinations thereof. In an example, the telematics unit 14 is further configured to monitor, in real-time, conditions along the road segment during the real-time monitoring of the vehicle data. Non-limiting examples of conditions along the road segment include the type of road segment (such as, e.g., a black-topped road segment, a concrete road segment, a dirt road segment, a gravel road segment, etc.), speed limit, road geometry (e.g., curves, inclines, declines, etc.), hazards present in the road segment (e.g., pot holes, cracks, fallen trees, boulders, disables vehicles, etc.), and/or the like.

In an example, the telematics unit 14 may also be configured to transmit the vehicle data to the call center 24 to determine a then-current operation of the vehicle 12 to achieve the optimal fuel efficiency. In another example, the telematics unit 14 may also be (or may otherwise be) configured to store the vehicle data in the electronic memory 38. Such stored vehicle data may be used by one or more programs (operated by the electronic processor 36) to determine a desirable mode or operation of the vehicle 12. In some instances, the desirable mode/operation of the vehicle 12 may be used to formulate a protocol for operating the vehicle 12. The desirable mode/operation of the vehicle 12 (including the operation protocol, if one is available) may be submitted either i) to the vehicle operator as a suggestion, or ii) to the powertrain system 84 of the vehicle 12 in order to increase or maintain the then-current fuel efficiency of the vehicle 12. If the operation of the vehicle 12 is submitted to the vehicle operator as a suggestion, the operation of the vehicle 12 may be observable by the vehicle operator using, for example, an in-vehicle audio system or component 60, or a display 80 (both of which will be described further hereinbelow). The method of communicating then-current operations/operating conditions will be described in further detail below in conjunction with FIG. 2.

It is to be understood that the telematics unit 14 may be implemented without one or more of the above listed components, such as, for example, the short-range wireless communication network 48. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor.

The location detection chipset/component 44 may include a Global Position System (GPS) receiver, a radio triangulation system, a dead reckoning position system, and/or combinations thereof In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies such as TDMA (time division multiple access), CDMA (code division multiple access) and GSM (global system for mobile telecommunications). In some instances, the protocol may be a short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

The telematics unit 14 provides numerous services, some of which may not be listed herein. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering.

Vehicle communications generally utilize radio transmissions to establish a voice channel with wireless carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

Microphone 28 provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the call center 24 (whether it be a live advisor 62 or an automated call response system 62'). In another example, one of the buttons 32 may be used to initiate emergency services.

The audio component 60 is operatively connected to the vehicle bus 34 and the audio bus 58. The audio component 60 is also in operative communication with the telematics unit 14 via the vehicle bus 34. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58. Additionally, the audio component 60 may include software for receiving, from the telematics unit 14, a suggestion for a vehicle 12 operation that is designed to increase or maintain the then-current fuel efficiency of the vehicle 12.

The vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, environmental detection sensors, and/or the like. One or more of the sensors 64 enumerated above may be used to obtain the vehicle data for use by the telematics unit 14 or the call center 24 to determine the operation of the vehicle 12. Non-limiting example sensor interface modules 66 include powertrain control, climate control, body control, and/or the like.

In a non-limiting example, the vehicle hardware 26 includes a display 80, which may be operatively directly connected to or in communication with the telematics unit 14, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like. The display 80 may, in an example, include software for receiving the suggestion of the operation of the vehicle 12, from one of the telematics unit 14 or the call center 24, and displaying the suggestion to the vehicle operator.

Wireless carrier/communication system 16 may be a cellular telephone system or any other suitable wireless system that transmits signals between the vehicle hardware 26 and land network 22. According to an example, wireless carrier/communication system 16 includes one or more cell towers 18, base stations and/or mobile switching centers (MSCs) 20, as well as any other networking components required to connect the wireless system 16 with land network 22. It is to be understood that various cell tower/base station/MSC arrangements are possible and could be used with wireless system 16. For example, a base station 20 and a cell tower 18 may be co-located at the same site or they could be remotely located, and a single base station 20 may be coupled to various cell towers 18 or various base stations 20 could be coupled with a single MSC 20. A speech codec or vocoder may also be incorporated in one or more of the base stations 20, but depending on the particular architecture of the wireless network 16, it could be incorporated within a Mobile Switching Center 20 or some other network components as well.

Land network 22 may be a conventional land-based telecommunications network that is connected to one or more landline telephones and connects wireless carrier/communication network 16 to call center 24. For example, land network 22 may include a public switched telephone network (PSTN) and/or an Internet protocol (IP) network. It is to be understood that one or more segments of the land network 22 may be implemented in the form of a standard wired network, a fiber of other optical network, a cable network, other wireless networks such as wireless local networks (WLANs) or networks providing broadband wireless access (BWA), or any combination thereof.

Call center 24 is designed to provide the vehicle hardware 26 with a number of different system back-end functions and, according to the example shown here, generally includes one or more switches 68, servers 70, databases 72, live and/or automated advisors 62, 62', as well as a variety of other telecommunication and computer equipment 74 that is known to those skilled in the art. These various call center components are coupled to one another via a network connection or bus 76, such as one similar to the vehicle bus 34 previously described in connection with the vehicle hardware 26.

The call center 24 is in selective operative communication with the telematics unit 14. The computer equipment 74 at the call center 24 includes one or more software programs configured to i) receive a transmission of the vehicle data from the telematics unit 14, and ii) determine the then-current operation of the vehicle 12 to achieve the optimal fuel efficiency. As will be described in further detail below, the determination of the operation of the vehicle 12 may, in an example, be accomplished by comparing the vehicle data with data of one or more other vehicles that previously traveled on the road segment (upon which the vehicle 12 is currently traveling). The data from the other vehicle(s) may be retrieved from one or more of the databases 72 at the call center 24, in which such data is previously stored. In an example, the call center 24 also formulates a protocol for operating the vehicle 12 based on the determined operation of the vehicle 12. The call center 24 is further configured to send the operation of the vehicle 12 (as well as the operating protocol, if one is formulated) to the telematics unit 14.

The live advisor 62 may be physically present at the call center 24 or may be located remote from the call center 24 while communicating therethrough.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72. For example, database 72 may be designed to store subscriber profile records, subscriber behavioral patterns, or any other pertinent subscriber information. Although the illustrated example has been described as it would be used in conjunction with a manned call center 24, it is to be appreciated that the call center 24 may be any central or remote facility, manned or unmanned, mobile or fixed, to or from which it is desirable to exchange voice and data communications.

A cellular service provider generally owns and/or operates the wireless carrier/communication system 16. It is to be understood that, although the cellular service provider (not shown) may be located at the call center 24, the call center 24 is a separate and distinct entity from the cellular service provider. In an example, the cellular service provider is located remote from the call center 24. A cellular service provider provides the user with telephone and/or Internet services, while the call center 24 is a telematics service provider. The cellular service provider is generally a wireless carrier (such as, for example, Verizon Wireless®, AT&T®, Sprint®, etc.). It is to be understood that the cellular service provider may interact with the call center 24 to provide various service(s) to the user.

Figure 2:
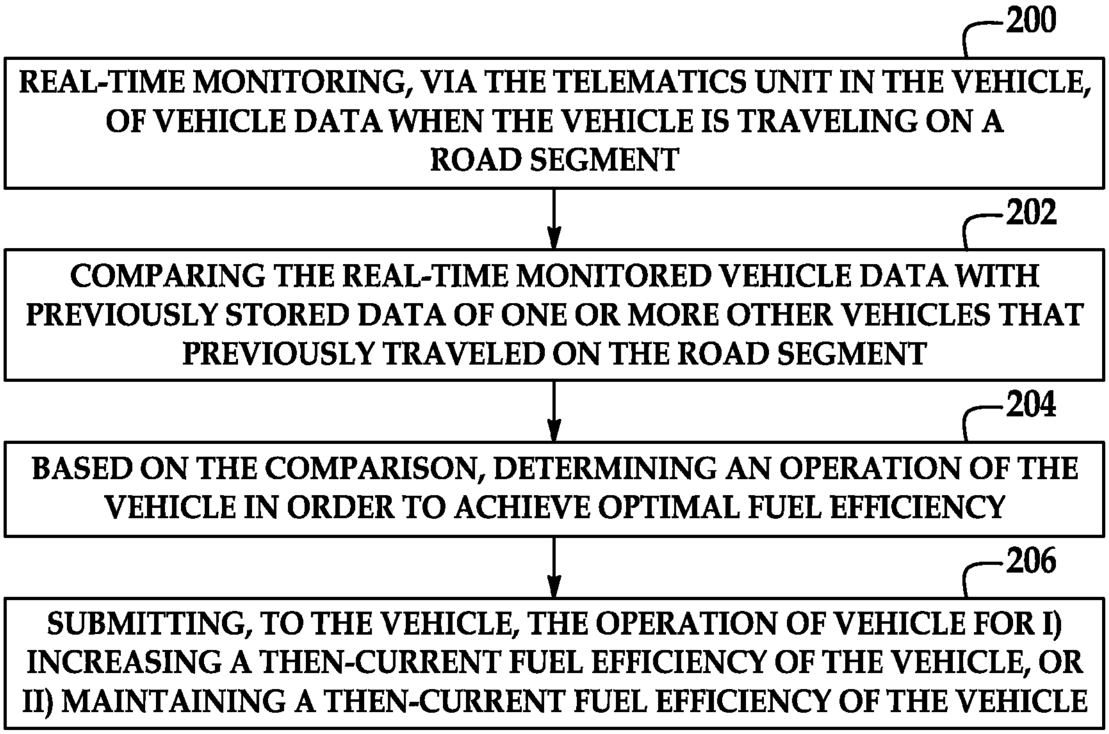
FIG. 2 is a flow diagram depicting an example of a method for communicating with a vehicle about then-current operating conditions.

An example of the method for communicating with the vehicle 12 about then-current vehicle operating conditions is depicted in FIG. 2. The method includes real-time monitoring, via the telematics unit 14, of vehicle data when the vehicle 12 is traveling on a particular road segment (as shown by reference numeral 200). In an example, one or more of the in-vehicle sensors 64 may be used to sense the vehicle data. The data is sent to the telematics unit 14 from the sensor(s) 64 in the form of data signals. It is to be understood that any vehicle data that is relevant for making a vehicle operation determination (which will be described below) may be obtained by the telematics unit 14. In instances where the vehicle data obtained is not conclusive enough to determine a suitable fuel efficient operation of the vehicle 12, additional data may be obtained by the telematics unit 14 from the sensor(s) 64.

In another example, the telematics unit 14 also monitors, in real-time, conditions along the road segment that the vehicle 12 is currently traveling on. Such real-time monitoring of the road conditions may occur during the real-time monitoring of the vehicle data. Data related to the road conditions may also be sensed by one or more in-vehicle sensor(s) 64 (e.g., the presence of certain road hazards or the like).

Additionally, the telematics unit 14 may obtain the current location of the vehicle 12 from the in-vehicle GPS component 44. Such location information may, for example, be sent to the call center 24, where information related to the road segment matching the location of the vehicle 12 is retrieved from the database 72 and transmitted back to the telematics unit 14. It is also possible that the location information may be used to obtain then-current traffic conditions or problems on the particular road segment from, e.g., a traffic information server.

The sensing of the vehicle data (and, in some instances, data related to conditions of the road segment) may occur periodically (e.g., at pre-set intervals) or on demand (e.g., in response to a request from the vehicle driver). In instances where the data is sensed on demand, the vehicle operator may request, from the telematics unit 14, an operation of the vehicle 12 to achieve the optimal fuel efficiency at that particular instant of time or during that travel period. Such request may be made, for example, by i) verbally reciting the request into the microphone 28 in operative communication with the telematics unit 14, or ii) physically inputting the request via, e.g., a button press or the like. After the request is made, the telematics unit 14 sends a signal to the sensor(s) 64 requesting sensing of appropriate vehicle data for subsequent use in determining the desirable fuel efficient operation of the vehicle 12. If, on the other hand, the vehicle data is sensed periodically, the telematics unit 14 may be programmed to automatically send a request signal to the sensor(s) 64 every minute, every ten minutes, every thirty minutes, or at any other predefined time intervals. Alternatively, for periodic sensing, the sensor(s) 64 may be programmed to automatically transmit data at the predefined time intervals without a request from the telematics unit 14. It is to be understood that the time frame associated with the periodic sensing of the vehicle data may be initially set by the manufacturer, but may be subsequently controlled by the vehicle driver and/or interrupted by the vehicle driver if, for example, the vehicle driver wants the operation of the vehicle 12 at a time in-between two intervals.

The sensed vehicle data (and, where applicable, the sensed road condition data) are sent to the telematics unit 14 from the sensor(s) 64 via the vehicle bus 34 in the form of one or more signals. The telematics unit 14 may, in an example, store the vehicle data (and road condition data) in the memory 38 operatively associated therewith for use by the processor 36 to determine the then-current operation of the vehicle 12 (as will be described in further detail below). In another example, the vehicle data (and road condition data, if any) is instantaneously transmitted from the telematics unit 14 to the call center 24, where the data is then stored in one of the databases 72. The call center 24 uses the data to make the determination of the operation of the vehicle 12 (as will also be described in further detail below). It is to be understood that the data may also be stored in the telematics unit memory 38 and transmitted to the call center 24 for storage in the database 72.

The example of the method shown in FIG. 2 further includes comparing the real-time monitored vehicle data (and the data related to the road conditions, if any) with previously stored data of one or more other vehicles that previously traveled on the road segment (as shown by reference numeral 202). Based on the comparison, an operation of the vehicle 12 is determined in order to achieve optimal fuel efficiency (as shown by reference numeral 204). In one example, the comparison of the real-time monitored data and the determination of the operation of the vehicle 12 are accomplished at the call center 24, which will be described further herein in connection with FIG. 3. In another example, the comparison and the determination are accomplished at the telematics unit 14, which will be described further herein in connection with FIG. 4.

Figure 3:
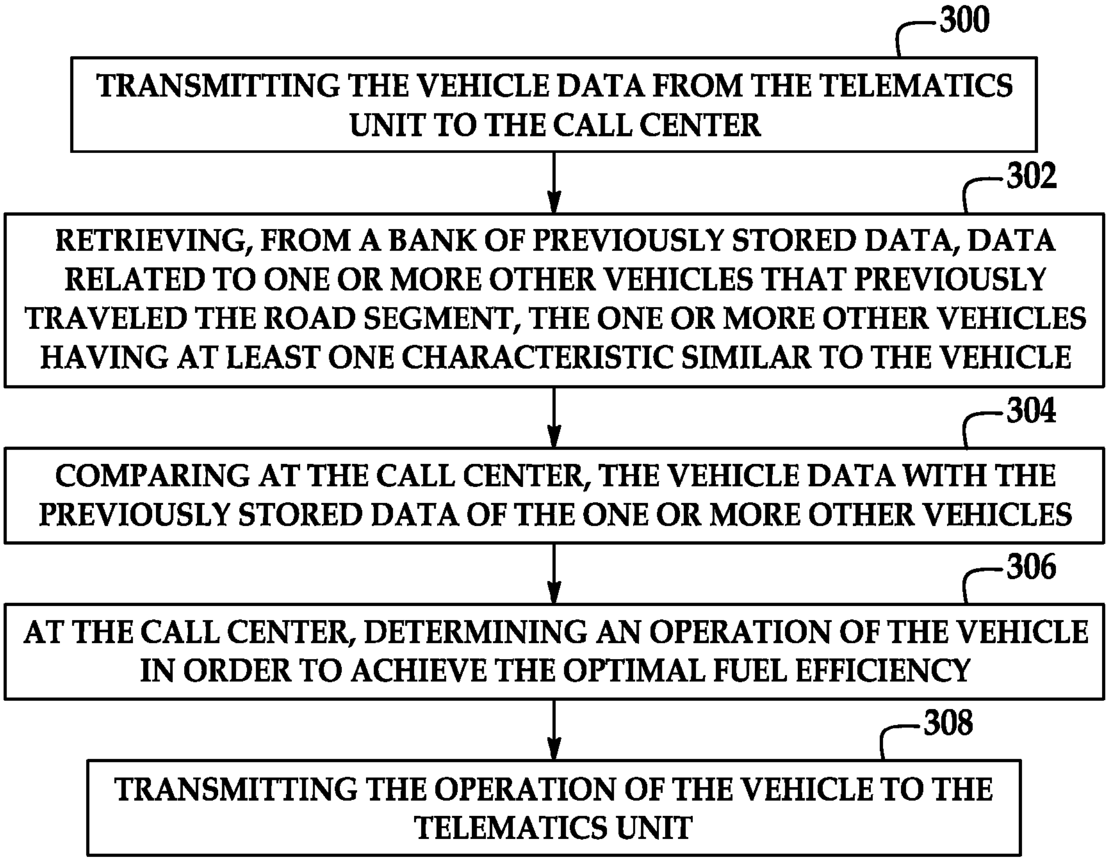
FIG. 3 is a flow diagram depicting another example of a method for communicating with a vehicle about then-current operating conditions.

Referring now to FIG. 3, in an example, the vehicle data obtained by the telematics unit 14 is transmitted from the telematics unit 14 to the call center (as shown by reference numeral 300). Upon receiving the vehicle data transmission, the call center 24 retrieves, from the bank/database 72 of the previously stored data, data related to one or more other vehicles that previously traveled the road segment (as shown by reference numeral 302). The previously stored data of the other vehicle(s) may include the same type of data as the vehicle data for the vehicle 12, except that the previously stored data is specific for the other vehicle(s). The previously stored data may include data related to the road segment (such as physical characteristics of the road segment including elevation changes, portions of the road segment that are straight, turns in the road segment, the type of road segment (e.g., two-lane highway, four-lane highway, etc.)), as well as data related to the fuel efficiency of other vehicles that previously traveled on the road segment. The previously stored data may also include, for example, then-current environmental conditions, vehicle characteristics, and/or the like, and/or combinations thereof. It is to be understood that the previously stored data may be used in the comparison to determine the operating conditions of the vehicle 12 so that the vehicle 12 may achieve a then-current optimal fuel efficiency. Accordingly, the previously stored data for making the comparison may be selected from a bank/database 72 of stored data from a number (e.g., tens, hundreds, thousands, etc.) of other vehicles.

It is to be understood that the previously stored data may be adaptive. For example, the database 72 including the previously stored data will initially include data related to the road segment, and will eventually include data related to a first vehicle at a particular instant in time. As more and more vehicles travel the road segment, vehicle data for each of these vehicles is uploaded to and stored in the database 72, where such data is accumulated (i.e., additional data is included with the data of road segment and any previous vehicles (e.g., the first vehicle)). As more data from other vehicles (e.g., the second, third, fourth vehicles, etc.) are added to the previously stored data, the volume of data available for determining operating modes/protocols increases. As more data is accumulated, fuel efficient mode(s) of operating and/or the operating protocol(s) may be tailored for specific vehicles and/or vehicle types. It is believed that with more data, the fuel efficient mode(s) of operating and/or the operating protocol(s) may become substantially more accurate and/or reliable, and may be implemented relatively quickly into the vehicle 12 currently traveling on the road segment.

The previously stored data may also be organized or binned, e.g., according to a vehicle make/model. Operating ranges/values of the vehicles are then subcategorized under each make/model. The data may also be arranged according to, for example, the date and time at which the data was logged. Each subcategory may also have associated therewith suggested conditions for operating a vehicle having a similar make/model when such vehicle is operated under certain conditions. For example, if the logged vehicle data relates to the speed of a number of vehicles on a particular road segment during rush hour, a suggested condition may be an average speed (calculated using the logged data) for one or more vehicle types traveling on the road segment during such hours.

It is to be understood that when the comparison is made, the vehicle data may be compared with data for one or more vehicle selected as having at least one characteristic that is similar to the vehicle 12 (e.g., a similar make/model, similar specific operating conditions, similar environmental conditions to when the vehicle associated with the previously stored data was operated, similar road conditions, and/or the like). Accordingly, the data retrieved by the call center 24 from the database 72 of previously stored data includes the data for the one or more other vehicles selected as having at least one characteristic that is similar to the vehicle 12. Such a characteristic may be selected in order to query the database 72 for other vehicle information using the selected characteristic. As such, in some instances, the vehicles associated with the previously stored data may not necessarily have the same make/model as the vehicle 12. However, if one or more vehicles having the same make/model turns up in the search, the previously stored data for that/those vehicle(s) may advantageously be used to make the comparison. It is to be understood, however, that an exact match of the make/model is not always available. In such cases, the call center 24 or the telematics unit 14 (depending on which one is making the comparison and the determination) will select the data for the comparison based upon another matching characteristic or another similar vehicle. It is further to be understood that, in some instances, the closest match of the previously stored data with the vehicle 12 data may be a combination of data for two or more other vehicles. In these instances, the data from each of the other matched vehicles will be used to eventually determine the operation of the vehicle 12 to achieve optimal fuel efficiency.

As briefly mentioned above, the call center 24 may retrieve the previously stored data from the appropriate database(s) 72 by running a query for information related to vehicles that have one or more common or similar characteristics with the vehicle 12. The query is run on the database 72 that includes the previously stored data. In response, the database 72 sends any retrieved information resulting from the query to one or more computers (e.g., computer 74) at the call center 24, where the information is thereafter used in making the comparison.

In some instances, the database 72 may not include previously stored data of another vehicle that is a close enough match to the vehicle 12 to render an adequate determination of vehicle operating conditions to achieve optimal fuel efficiency for the vehicle 12. In such instances, the call center 24 may query one or more vehicles presently on the particular road segment to transmit their own vehicle data (and data related to the road conditions, if any) to the call center 24. Such data is immediately saved as new previously stored data in the database 72, and may be used by the computer 74 to make the comparison. Prior to using this data in the comparison, the call center 24 will determine if the new data is sufficient to make the comparison.

At the call center 24, the then-current monitored vehicle data (for vehicle 12) is compared to the previously stored data retrieved from the database 72 at the call center 24 (as shown by reference numeral 304). After the call center 24 makes the comparison, the operation of the vehicle 12 is determined (as shown by reference numeral 204 in FIG. 2 and by reference numeral 306 in FIG. 3). The computer 74 at the call center 24 runs a program, using the results of the comparison, to determine an operation of the vehicle 12 that will or is believed to achieve optimal fuel efficiency (as shown by reference numeral 306). As such, the determination may be based, at least in part, on the comparison between the vehicle data (including the data related to the road conditions, if present) and the previously stored data. More specifically, the call center 24 analyzes the previously stored data of the other vehicle(s), and from the analysis, the call center 24 determines a fuel efficient mode of operating the vehicle 12 based on the previously stored data. Non-limiting examples of fuel efficient modes of operating the vehicle include optimal tire pressure, optimal vehicle speed, powertrain parameters or characteristics, a specific driving technique, and/or the like. The fuel efficient mode of operating the vehicle 12 may include one or more of the above-listed modes that, if applied, will either increase or at least maintain a then-current fuel efficiency of the vehicle 12.

The fuel efficient mode of operating the vehicle 12 is thereafter transmitted to the telematics unit 14 (as shown by reference numeral 308 in FIG. 3). It is to be understood that, in some instances, the fuel efficient mode of operating the vehicle 12 is accompanied with a protocol for operating the vehicle 12. At the telematics unit 14, a determination is made as to whether the fuel efficient mode of operating (and the operating protocol, if any) is suitable for the vehicle 12 currently traveling on the road segment. The determination may be made, for example, by comparing the fuel efficient mode of operating with the previously stored data. In an example, the telematics unit 14 requests, from the call center 24, the previously stored data and uses the data for the comparison. In another example, the data may be stored at the telematics unit 14. In this example, the call center 24 may periodically send updates of the previously stored data to the telematics unit 14 so that the data used for the comparison is accurate or up to date.

In the event that the telematics unit 14 determines that the mode of operating is not suitable for the vehicle 12, the fuel efficient mode of operating is reformulated. Reformulating may be accomplished, for example, by sending a request from the telematics unit 14 to the call center 24 to retrieve other previously stored data from the database 72 and compare the other previously stored data to the real-time monitored vehicle data. From the additional comparison, a reformulated mode of operating is determined by the call center 24 and transmitted back to the telematics unit 14. At this point, the telematics unit 14 may either accept or reject the reformulated mode of operating the vehicle 12. If the telematics unit 14 rejects the reformulated mode of operating, another new reformulated mode of operating may be determined at the call center 24.

Referring back to FIG. 2, in the event that the telematics unit 14 determines that the original mode of operating is suitable or accepts a reformulated mode of operating, the fuel efficient mode of operating the vehicle 12 (and the operating protocol, if one is available) may be submitted to the vehicle for i) increasing a then-current fuel efficiency of the vehicle 12, or ii) maintaining the then-current fuel efficiency of the vehicle 12 (as shown by reference numeral 206). In an example, the operation of the vehicle (and the operating protocol, if any) is submitted to the vehicle operator (via the audio system 60 or the display 80) as a suggestion. The vehicle operator has the discretion of whether to i) implement the mode of operation and/or the operating protocol, or ii) reject the mode of operating and/or the operating protocol. If the vehicle operator implements the mode of operation, he/she may indicate as such by verbally responding “yes” into the microphone 28 and/or actuating a button associated with the telematics unit 14 to indicate a “yes” response. The telematics unit 14 then forwards the mode of operating and/or the operation protocol to the appropriate vehicle system(s) (e.g., the powertrain system 84) to implement the changes. If, on the other hand, the vehicle operator rejects the suggestion, he/she may verbally respond “no” into the microphone 28, actuate a button associated with the telematics unit 14 indicating a “no” response, or do nothing (i.e., if automatic implementation of the operation/protocol is not functioning or available).

In another example, the mode of operating and, in some instances, the operating protocol may be automatically transmitted to the powertrain system 84 of the vehicle 12 without providing a suggestion to the vehicle operator. For example, the operating mode may be automatically implemented by the powertrain system 84 upon receiving the operating protocol instruction(s). In another example, the powertrain system 84 may also reject the operating protocol instruction(s) in the event that the powertrain system 84 is not configured to operate within suggested limits and/or preferences included in the protocol.

It is to be understood that the fuel efficient mode of operating the vehicle 12 and/or the operating protocol, if implemented, may enable a better then-current fuel efficiency for the vehicle 12. In some instances, the mode/operating protocol may be different from a then-current mode/operating protocol of the vehicle 12. In such instances, the fuel efficiency is, in most cases, increased if the new mode/operating protocol is implemented. In other instances, the mode/operating protocol is the same as the then-current mode/operating protocol of the vehicle 12. In these instances, the fuel efficiency is usually maintained. It is further to be understood that if the fuel efficiency of the vehicle 12 at that instant of time cannot be increased, the suggestion may otherwise indicate that the then-current vehicle operating conditions should be maintained.

Figure 4:
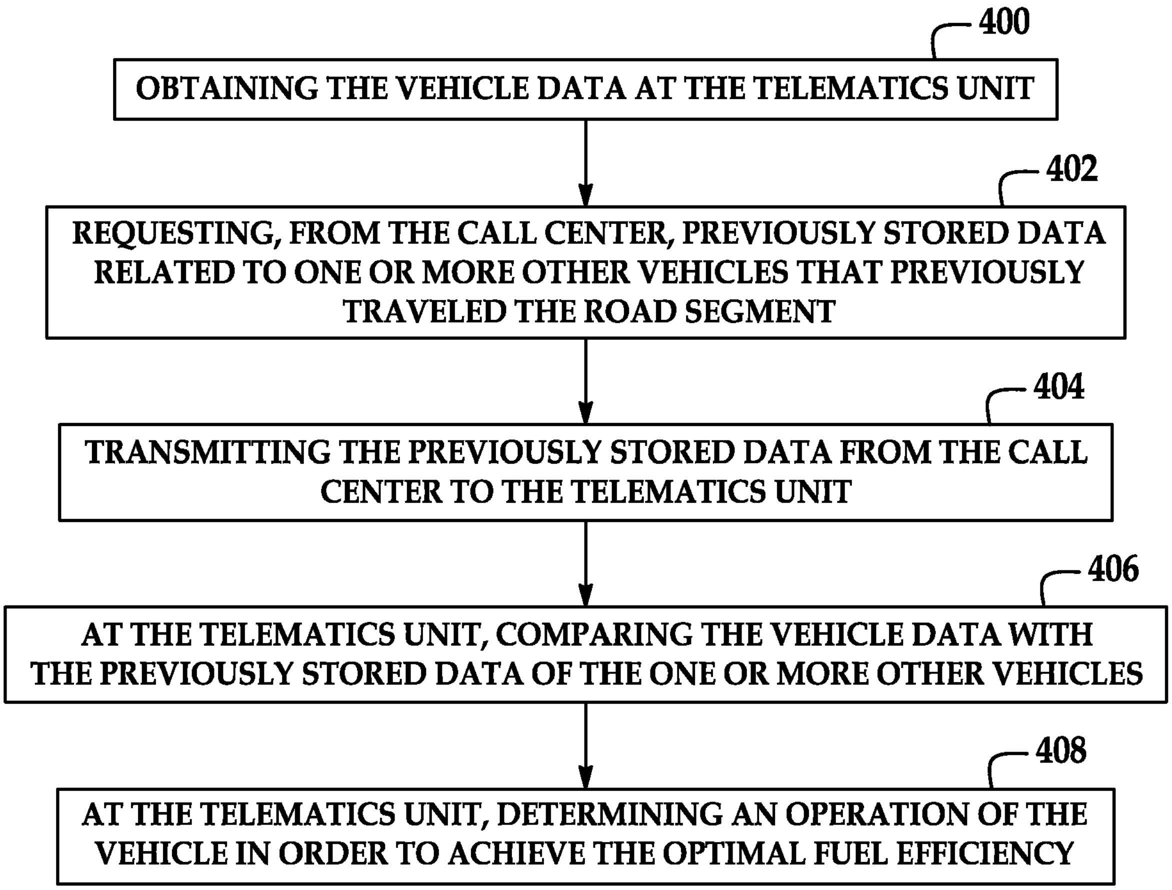
FIG. 4 is a flow diagram depicting yet another example of a method for communicating with a vehicle about then-current operating conditions.

Referring now to FIGS. 2 and 4 together, in an example, the comparing and the determining may be accomplished at the telematics unit 14. In this example, the vehicle data is obtained by the telematics unit 14 (as shown by reference numeral 400) and then the telematics unit 14 requests, from the call center 24, previously stored data related to one or more other vehicles that previously traveled the road segment (as shown by reference numeral 402). The call center 24 thereafter transmits the previously stored data from the call center 24 to the telematics unit 14 (as shown by reference numeral 404). In one example, upon receiving the request, the call center 24 selects suitable previously stored data from the database 72, and sends the selected data to the telematics unit 14. In this example, the telematics unit 14 sends, to the call center 24, a vehicle identification number (VIN) or other identification means, as well as the vehicle data and environmental conditions (if any). If the vehicle 12 is associated with a subscriber, the call center 24 includes, in one of the databases 72, relevant information related to, e.g., the make, model, year, etc. of the vehicle 12. When the telematics unit 14 sends the vehicle identification to the call center (as well as the vehicle data and environmental conditions (if any)), the call center 24 looks up the vehicle 12 in the database 72 and then uses the information stored therein, the vehicle data, and/or the environmental data to select appropriate previously stored data from the database 72. In another example, upon receiving the request, the call center 24 sends all of the data generated from a query run on the database 72 (using one or more characteristics of the vehicle 12) to the telematics unit 14, and the telematics unit selects the appropriate data for making the comparison.

Still with reference to FIG. 4, the vehicle data is compared to the previously stored data at the telematics unit 14 (as shown by reference numeral 406). The operation of the vehicle (and, in some instances, the operating protocol) is determined by the telematics unit 14 in order to achieve the optimal fuel efficiency (as shown by reference numeral 408).

In another example of the method of communicating the then-current operating conditions to the vehicle 12, the telematics unit 14 may determine and/or recognize that an implemented fuel efficient mode of operating and/or an operating protocol is in fact fuel efficient. This may be accomplished by comparing the fuel efficient mode of operating and/or the operating protocol with the previously stored data described above. If such a determination/recognition is made, the telematics unit 14 transmits to the database 72 at the call center 24 the implemented fuel efficient mode of operating and/or the operating protocol as new data to be associated with the road segment. This new data becomes part of the previously stored data for later retrieval by the call center 24 when determining new fuel efficient modes of operating for the vehicle 12 or for other vehicles. It is to be understood that each time a new fuel efficient mode of operating is determined and saved, the amount of data in the database 72 increases, thereby increasing the potential for closer matches to be made with other real-time monitored vehicle data.

While several examples have been described in detail, it will be apparent to those skilled in the art that the disclosed examples may be modified. Therefore, the foregoing description is to be considered exemplary rather than limiting.

The invention claimed is:

1. A method for communicating with a vehicle about then-current vehicle operating conditions, comprising:

real-time monitoring, via a telematics unit in a vehicle, of vehicle data when the vehicle is traveling on a road segment;

comparing the real-time monitored vehicle data with previously stored data of one or more other vehicles that previously traveled on the road segment, the comparing including:

running a query for information related to vehicles that have one or more common characteristics with the vehicle, the query being run in a database which includes the previously stored data of the one or more other vehicles that previously traveled on the road segment;

receiving the information as a result of the query; and comparing the real-time monitored vehicle data with the information from the query;

based on the comparison, determining an operation of the vehicle in order to achieve optimal fuel efficiency; and submitting, to the vehicle, the operation of the vehicle for i) increasing a then-current fuel efficiency of the vehicle or ii) maintaining the then-current fuel efficiency of the vehicle.

2. The method as defined in claim 1 wherein the comparing is accomplished at a call center in selective operative communication with the telematics unit, and wherein prior to the comparing, the method further comprises transmitting the real-time monitored vehicle data from the telematics unit to the call center.

3. The method as defined in claim 1 wherein the real-time monitored vehicle data and the previously stored data of the one or more other vehicles are each independently selected from tire pressure, speed, vehicle weight, fuel efficiency, air temperature, elevation, pitch and yaw information of the vehicle, local traffic information, and combinations thereof.

4. The method as defined in claim 1, further comprising real-time monitoring of conditions along the road segment during real-time monitoring of the vehicle data.

5. The method as defined in claim 4 wherein comparing also includes comparing the real-time monitored conditions along the road segment with previously stored data of conditions along the road segment, such previously stored road segment conditions being associated with the one or more other vehicles that previously traveled on the road segment.

6. The method as defined in claim 1 wherein the operation of the vehicle is submitted to the vehicle as a suggestion for the vehicle operator.

7. The method as defined in claim 6 wherein the suggestion includes informing the vehicle operator to maintain the then-current vehicle operating conditions.

8. The method as defined in claim 6 wherein the operation of the vehicle is automatically submitted to a powertrain system of the vehicle.

9. The method as defined in claim 6 wherein operation of the vehicle includes a protocol for operating the vehicle in order to achieve the optimal fuel efficiency.

10. A method for communicating with a vehicle about then-current vehicle operating conditions, comprising:

real-time monitoring, via a telematics unit in a vehicle, of vehicle data when the vehicle is traveling on a road segment;

requesting, from a call center, previously stored data related to one or more other vehicles that previously traveled on the road segment;

at the call center, running a query for information related to vehicles that have one or more common characteristics with the vehicle, the query being run in a database which includes the previously stored data of the one or more other vehicles that previously traveled on the road segment;

receiving the information as a result of the query;

transmitting the previously stored data of the one or more other vehicles from the call center to the telematics unit, the call center being in selective operative communication with the telematics unit;

via the telematics unit, comparing the real-time monitored vehicle data with the information from the query;

based on the comparison, determining an operation of the vehicle in order to achieve optical fuel efficiency; and submitting, to the vehicle, the operation of the vehicle for i) increasing a then-current fuel efficiency of the vehicle or ii) maintaining the then-current fuel efficiency of the vehicle.

11. A method for communicating with a vehicle about then-current vehicle operating conditions, comprising:

real-time monitoring, via a telematics unit in a vehicle, of vehicle data when the vehicle is traveling on a road segment;

comparing the real-time monitored vehicle data with previously stored data of one or more other vehicles that previously traveled on the road segment;

based on the comparison, determining an operation of the vehicle in order to achieve optimal fuel efficiency; and submitting, to the vehicle, the operation of the vehicle for i) increasing a then-current fuel efficiency of the vehicle or ii) maintaining the then-current fuel efficiency of the vehicle;

wherein the comparing and the determining includes:

analyzing the previously stored data of the one or more other vehicles that previously traveled on the road segment;

determining a fuel efficient mode of operating based on the previously stored data of the one or more other vehicles that previously traveled on the road segment; and determining whether the fuel efficient mode of operating is suitable for the vehicle traveling on the road segment.

12. The method as defined in claim 11 wherein the fuel efficient mode of operating is not suitable for the vehicle traveling on the road segment, and wherein the method further comprises reformulating the fuel efficient mode of operating for the vehicle.

13. The method as defined in claim 11 wherein the fuel efficient mode of operating is suitable for the vehicle traveling on the road segment, and wherein the suggestion includes the fuel efficient mode of operating.

14. The method as defined in claim 13, further comprising:

implementing the suggested fuel efficient mode of operating in the vehicle traveling on the road segment;

recognizing, via the telematics unit, that the implemented fuel efficient mode of operating is in fact fuel efficient; and transmitting, from the telematics unit to database in selective operative communication therewith, the implemented fuel efficient mode of operating as new data to be associated with the road segment.

15. A system for communicating with a vehicle about then-current vehicle operating conditions, comprising:

a telematics unit operatively disposed in a vehicle, the telematics unit configured to real-time monitor vehicle data when the vehicle is traveling on a road segment;

a call center in selective operative communication with the telematics unit, the call center being configured to compare the real-time monitored vehicle data with previously stored data of one or more other vehicles that previously traveled on the road segment by:

running a query for information related to vehicles that have one or more common characteristics with the vehicle, the query beinq run in a database which includes the previously stored data of the one or more other vehicles that previously traveled on the road segment;

receiving information as a result of the query; and comparing the real-time monitored vehicle data with the information from the query;

the call center further being configured to determine, based on the comparison, an operation of the vehicle in order to achieve optimal fuel efficiency; and means for submitting, to the vehicle, the operation of the vehicle for i) increasing a then-current fuel efficiency of the vehicle or ii) maintaining a then-current fuel efficiency of the vehicle.

16. The system as defined in claim 15 wherein the operation of the vehicle is submitted to the vehicle in the form of a suggestion for a vehicle operator, and wherein the system further comprises means for providing the suggestion to the vehicle operator.

17. The system as defined in claim 16 wherein the means for providing the suggestion includes an in-vehicle audio system or display observable by a vehicle operator and in operative communication with the telematics unit.

18. The system as defined in claim 15 wherein the operation of the vehicle is submitted to the vehicle as an automatic transmission to a powertrain system of the vehicle, and wherein the method further comprises means for automatically transmitting the operation of the vehicle to the powertrain system of the vehicle.

19. A system for communicating with a vehicle about then-current vehicle operating conditions, comprising:

a telematics unit operatively disposed in a vehicle, the telematics unit configured to real-time monitor vehicle data when the vehicle is traveling on a road segment;

a call center in selective operative communication with the telematics unit, at least one of the call center or the telematics unit configured to:

analyze previously stored data of one or more vehicles that previously traveled on a road segment;

determine a fuel efficient mode of operating based on the previously stored data of the one or more other vehicles that previously traveled on the road segment; and determine whether the fuel efficient mode of operating is suitable for the vehicle traveling on the road segment; and means for submitting, to the vehicle, the fuel efficient mode of operating the vehicle for i) increasing a then-current fuel efficiency of the vehicle or ii) maintaining a then-current fuel efficiency of the vehicle.

* * * * *